United States Patent
Lannuzel et al.

(10) Patent No.: US 6,867,273 B2
(45) Date of Patent: Mar. 15, 2005

(54) VINYLIDENE FLUORIDE POLYMERS, PROCESS FOR MANUFACTURING THEM AND USE THEREOF

(75) Inventors: Thierry Lannuzel, Brussels (BE); Vincent Meunier, Evere (BE); Régis Faig, Baverans (FR); Olivier Vidberg, Tavaux (FR)

(73) Assignee: Solvay (Societe Anonyme), Brussels (BE)

( * ) Notice: Subject to any disclaimer, the term of this patent is extended or adjusted under 35 U.S.C. 154(b) by 0 days.

(21) Appl. No.: 10/343,151

(22) PCT Filed: Jul. 26, 2001

(86) PCT No.: PCT/EP01/08645

§ 371 (c)(1),
(2), (4) Date: Jan. 29, 2003

(87) PCT Pub. No.: WO02/10233

PCT Pub. Date: Feb. 7, 2002

(65) Prior Publication Data

US 2003/0176608 A1 Sep. 18, 2003

(30) Foreign Application Priority Data

Jul. 31, 2000 (FR) .......................................... 00 10169

(51) Int. Cl.$^7$ ............................................. C08F 214/22
(52) U.S. Cl. ........................ 526/250; 526/249; 526/199
(58) Field of Search ................................. 526/250, 249; 525/199

(56) References Cited

U.S. PATENT DOCUMENTS

| 4,032,699 | A | | 6/1977 | West, III ...................... 526/18 |
| 5,292,816 | A | | 3/1994 | Metz et al. .................. 525/276 |
| 5,593,730 | A | * | 1/1997 | Satgurunathan et al. .... 427/386 |
| 6,160,053 | A | * | 12/2000 | Enokida et al. ............. 525/199 |
| 6,207,758 | B1 | * | 3/2001 | Brinati et al. ................ 525/200 |
| 6,329,472 | B1 | * | 12/2001 | Kim et al. ................ 525/326.9 |
| 6,645,620 | B1 | * | 11/2003 | Dupuy et al. ................ 428/361 |
| 2002/0035178 | A1 | * | 3/2002 | Abusleme et al. .......... 524/165 |

FOREIGN PATENT DOCUMENTS

| EP | 0 131 203 | | 1/1985 |
| EP | 131203 A1 | * | 1/1985 |
| EP | 1 043 732 | | 10/2000 |
| FR | 2 323 711 | | 4/1977 |
| FR | 2 786 191 | | 5/2000 |
| JP | 01012858 | | 1/1989 |
| JP | 10120858 A | | 5/1998 |
| WO | WO 99/34372 | | 7/1999 |
| WO | WO 00/31177 | | 6/2000 |

* cited by examiner

Primary Examiner—David W. Wu
Assistant Examiner—Henry S. Hu
(74) Attorney, Agent, or Firm—Oblon, Spivak, McClelland, Maier & Neustadt, P.C.

(57) ABSTRACT

Vinylidene fluoride polymers, characterized in that they are thermoplastic vinylidene fluoride/chlorotrifluoroethylene/hexafluoropropylene terpolymers and in that they contain at least 70% vinylidene fluoride, process for obtaining them and use thereof.

20 Claims, No Drawings

VINYLIDENE FLUORIDE POLYMERS, PROCESS FOR MANUFACTURING THEM AND USE THEREOF

The present invention relates to vinylidene fluoride polymers, to a process for manufacturing them and to their use.

Vinylidene fluoride homopolymer (PVDF) is a polymer known especially for its high chemical inertness and its high resistance to ultraviolet radiation, combined with excellent mechanical strength. However, it does have the drawback of lacking flexibility, thereby limiting its uses in fields where this property is required.

It is known to improve the flexibility of PVDF by incorporating monomeric units derived from halogenated comonomers such as, for example, chlorotrifluoro-ethylene.

Patent Application EP-A-0554931 discloses the manufacture of thermoplastic vinylidene fluoride/chlorotrifluoroethylene copolymers having good flexibility and a high melting point, together with a low embrittlement temperature, ensuring that flexible articles produced using them have a wide operating temperature range.

These copolymers are disadvantageously characterized by a heterogeneous distribution of the comonomers in the polymer chain, the consequence of which is that they are difficult to dissolve in certain organic solvents and/or the solutions obtained are not very stable. Now, some applications require the polymers to be processed in the form of a solution in an organic solvent, such as for example the production of lithium battery components (electrodes and separators) by coating, the coating of textiles and films, the covering of surfaces, and the production of membranes by phase inversion.

It is an object of the present invention to provide vinylidene fluoride polymers which do not have these drawbacks, while maintaining the advantages of the polymers of the prior art.

For this purpose, the invention relates to vinylidene fluoride polymers characterized in that they are thermoplastic vinylidene fluoride/chlorotrifluoroethylene/hexafluoropropylene terpolymers and in that they contain at least 70 mol % vinylidene fluoride.

The vinylidene fluoride polymers according to the invention in general contain at most 99 mol % vinylidene fluoride.

The vinylidene fluoride polymers according to the invention preferably contain from 0.5 to 20 mol % chlorotrifluoroethylene and from 0.5 to 15 mol % hexafluoropropylene.

Particularly preferably, the vinylidene fluoride polymers according to the invention contain at least 80 mol % vinylidene fluoride.

Most particularly preferably, the vinylidene fluoride polymers according to the invention contain from 80 to 99 mol % vinylidene fluoride, from 0.5 to 19.5 mol % chlorotrifluoroethylene and from 0.5 to 12 mol % hexafluoropropylene.

Vinylidene fluoride polymers containing from 81 to 98 mol % vinylidene fluoride, from 1 to 18 mol % chlorotrifluoroethylene and from 1 to 10 mol % hexafluoropropylene are particularly beneficial.

Vinylidene fluoride polymers containing at least 3 mol % chlorotrifluoroethylene and hexafluoropropylene are most particularly beneficial.

The term "thermoplastic polymers" is understood for the purposes of the present invention to mean polymers which, at room temperature, exist below their glass transition temperature if they are amorphous or between their glass transition temperature and their melting point if they are crystalline. These polymers have the property of becoming soft when they are heated and of becoming rigid again when they are cooled, without there being an appreciable chemical change. Such a definition may be found, for example, in the encyclopaedia called "Polymer Science Dictionary", 2nd edition, Mark Alger, School of Polymer Technology, University of North London, London, UK, Chapman & Hall, published in 1997.

The polymers according to the invention are therefore not polymers usually termed rubbers, that is to say amorphous polymers which, at room temperature, exist above their glass transition temperature so that the chain segments may undergo considerable motion. These polymers are therefore flexible and deformable, being so soft that, in order to be used, they must generally be crosslinked by vulcanization (one then speaks of elastomer polymers). The rubber elasticity of these polymers actually appears after vulcanization. Such definition may be found, for example, in the same encyclopaedia mentioned above.

The thermoplastic polymers according to the invention are preferably semicrystalline thermoplastic terpolymers.

Semicrystalline thermoplastic polymers within the meaning of the present invention are thermoplastic polymers which exist, at room temperature, between their glass transition temperature and their melting point and are characterized by a certain degree of crystallinity. The semicrystalline thermoplastic polymers according to the invention are generally characterized by a non-zero conventional crystallinity index.

The vinylidene fluoride polymers according to the invention are usually characterized by a mean particle diameter of at least 10 $\mu$m, preferably at least 25 $\mu$m and particularly preferably at least 50 $\mu$m.

The vinylidene fluoride polymers according to the invention are usually characterized by a mean particle diameter of at most 350 $\mu$m, preferably at most 200 $\mu$m and particularly preferably at most 150 $\mu$m.

The term "mean diameter" ($D_{50}$) is understood to mean, for the purposes of the present invention, the mean diameter measured using the laser diffraction technique as described in the examples of the present invention.

The vinylidene fluoride polymers according to the invention are usually characterized by an intrinsic viscosity greater than or equal to 0.05 l/g, preferably greater than or equal to 0.1 l/g and particularly preferably greater than or equal to 0.2 l/g.

The vinylidene fluoride polymers according to the invention are usually characterized by an intrinsic viscosity of less than or equal to 0.35 l/g, preferably less than or equal to 0.3 l/g and particularly preferably less than or equal to 0.25 l/g.

The vinylidene fluoride polymers according to the invention are generally characterized by a maximum solubility in acetone at room temperature of greater than or equal to 15 g, preferably greater than or equal to 17 g and particularly preferably greater than or equal to 20 g of polymer dissolved in 100 g of dry acetone.

The vinylidene fluoride polymers according to the invention are usually characterized by a maximum solubility in acetone at room temperature of less than or equal to 40 g, preferably less than or equal to 37 g and particularly preferably less than or equal to 35 g of polymer dissolved in 100 g of dry acetone.

The vinylidene fluoride polymers according to the invention are advantageously characterized by an improved homogeneity in the distribution of the comonomers in the polymer chain.

The vinylidene fluoride polymers according to the invention are usually characterized by an extremely wide range of mechanical properties in tension.

The invention also relates to a process for manufacturing the vinylidene fluoride polymers according to the invention, in which the vinylidene fluoride, the chlorotrifluoroethylene and the hexafluoropropylene are polymerized in aqueous suspension.

The term "polymerization in aqueous suspension" is understood for the purposes of the present invention to mean polymerization by means of oil-soluble initiators and in the presence of a suspension agent.

Usually, the polymerization takes place in the presence of at least one oil-soluble radical polymerization initiator and at least one suspension agent.

As representative examples of standard oil-soluble initiators for the radical polymerization of vinylidene fluoride, mention may be made of dialkyl peroxydicarbonates, acetyl cyclohexane sulphonyl peroxide, dibenzoyl peroxide, dicumyl peroxide, t-alkyl perbenzoates and t-alkyl perpivalates. However, preference is given to dialkyl peroxydicarbonates, such as diethyl and diisopropyl peroxydicarbonates, and to t-alkyl perpivalates, such as t-butyl and t-amyl perpivalates.

The initiator may be employed altogether at the start of the polymerization or in portions or continuously during the polymerization. The amount of oil-soluble initiator employed for the polymerization is not critical. It is therefore possible to employ the usual amounts of initiator, that is to say about 0.05 to 3 wt %, preferably about 0.05 to 2.5 wt % and more particularly preferably about 0.05 to 1 wt % with respect to the monomers employed.

As examples of usual suspension agents employed in the process of the invention, mention may be made of the suspension agents of the cellulose ether type, such as alkyl- and alkylhydroxyalkylcelluloses. Mention may be made, for example, of methylcellulose, methylhydroxy-ethylcellulose, methylhydroxypropylcellulose and ethyl-hydroxyethylcellulose. Usually, the suspension agent is employed in the aqueous polymerization medium and in a total amount of at least 0.03 wt %, preferably at least 0.05 wt %, with respect to the total weight of monomers employed in the polymerization. Likewise, the suspension agent is employed in the aqueous polymerization medium in a total amount of at most 0.6 wt %, preferably at most 0.4 wt % and most particularly preferably at most 0.2 wt % with respect to the total weight of monomers employed in the polymerization.

The maimer in which the suspension agent is employed is not critical. Preferably, all the suspension agent is employed at the start of the polymerization and, more particularly, by introducing it into the water before all the other polymerization ingredients (initiator, monomers, where appropriate chain regulator, etc.).

The manner in which the monomers are employed is not critical. The vinylidene fluoride may be employed all at the start of the polymerization or else a portion of vinylidene fluoride may be added at the start of the polymerization and the rest during polymerization.

Preferably, in the process according to the invention, the chlorotrifluoroethylene and the hexafluoropropylene are introduced at the start of the polymerization with at least a part of the vinylidene fluoride. The order in which the monomers are introduced at the start of the polymerization is not critical. At the start of the polymerization, firstly the two comonomers and then at least a part of the vinylidene fluoride are usually introduced. At the start of the polymerization, the monomers are preferably introduced by beginning with that one whose amount to be added is the least and finishing with that one whose amount to be added is the most.

In general, the polymerization is carried out in stirred tank reactors provided with a blade or shaft stirrer or impeller.

As mentioned above, the polymerization of vinylidene fluoride may be carried out in the presence of chain regulators. By way of examples of known vinylidene fluoride polymer chain regulators, mention may be made of ketones containing three or four carbon atoms, saturated alcohols containing three to six carbon atoms and dialkyl carbonates, the alkyl groups of which contain at most five carbon atoms, and in particular diethyl carbonate.

When a chain regulator is used, this is employed in the usual amounts. To be more specific, the chain regulators are generally employed in an amount of about 0.5 to 5 wt % with respect to the monomer employed. The chain regulator may be employed all at the start of the polymerization or else in portions or continuously during polymerization.

It does not matter whether the polymerization temperature is above or below the vinylidene fluoride critical temperature (30.1° C.). When the temperature is below 30.1° C., the polymerization is carried out within a conventional aqueous suspension of liquid vinylidene fluoride at a pressure equal to the saturation vapour pressure of vinylidene fluoride. When the temperature is above 30.1° C., the polymerization takes place within an aqueous suspension of gaseous vinylidene fluoride advantageously at high pressure. It is therefore possible to carry out the process according to the invention at temperatures ranging from room temperature to about 110° C. However, it is preferred to carry out the polymerization at a temperature above 30.1° C. According to a preferred method of implementing the process according to the invention, the polymerization is carried out at a temperature between 35 and 100° C. and with initial pressures of about 55 to 200 bar. Of course, it is possible during polymerization to increase the productivity of the reactors by injecting further amounts of vinylidene fluoride or of water or by raising the polymerization temperature.

At the end of polymerization, the vinylidene fluoride polymers obtained according to the process of the invention are conventionally isolated by draining followed by drying.

The invention also relates to the use of the vinylidene fluoride polymers according to the invention for the production of flexible articles formed as, for example, films, cables, seats, bellows, membranes, hoses or flexible pipes.

The invention also relates to the use of the vinylidene fluoride polymers according to the invention for the covering of surfaces, in particular by coating or lamination, for the coating of textiles and films, for example solid or hollow films, and for the production of membranes, for example by phase inversion.

The vinylidene fluoride polymers according to the invention may also be used for the production of electrical storage cell elements such as, for example, lithium batteries. In particular, they may be used as a binder for the production of electrodes (anodes or cathodes). They may also be used for the production of polymer electrolytes (separators).

The vinylidene fluoride polymers according to the invention have the advantage of being characterized by better homogeneity in the distribution of the comonomers in the polymer chain and of dissolving quickly and easily in acetone, thus facilitating their application by coating. The polymers according to the invention are also characterized by good flexibility, a high melting point and a low embrittlement temperature, ensuring that the flexible articles formed using them have a wide operating temperature range.

The examples which follow are intended to illustrate the invention without, however, limiting the scope of thereof.

Measurement of the MFI (Melt Flow Index)

The MFI of the polymer obtained was measured according to the ASTM D 1238 standard at a temperature of 230° C. and with a weight of 21.6 kg, 10 kg or 5 kg.

Measurement of the Apparent Density After Tamping (ADAT)

The apparent density after tamping (ADAT), expressed in g/cm$^3$, was measured by mechanically tamping, under well defined drop-height and duration conditions, a known weight of the polymer in powder form introduced into a graduated test tube.

Measurement of the Content of the Various Comonomers of the Polymer

The content of the various comonomers in the polymer was determined by $^{19}$F NMR by means of a Bruker DPX 300 NMR spectrometer able to work in $^{19}$F mode at 120° C. The measurements were carried out on a solution of the polymer in deuterated dimethyl sulphoxide (examples 1–8) or in a mixture N,N-dimethylacetamide/deuterated benzene (±10 volume %) (example 9), at 120° C. The spectrum obtained was in the form of lines assignable to the CF$_3$ group of HFP (−70 to −77 ppm), to the CF$_2$ groups of VF$_2$, HFP and CTFE (−80 to −120 ppm) and to the CFCl group of CTFE.

The assay consisted in determining the relative contents of VF$_2$, HFP and CTFE from the integrals of the lines. A molar or weight ratio was deduced therefrom. The relative content of HFP was determined by taking one third of the CF$_3$ integral (−70 to −77 ppm range). The relative content of CTFE was determined by taking the value of the CFCl integral (−120 to −137 ppm range). The relative content of VF$_2$ was determined by difference. To do this, the CF$_2$ integral (−88 to −120 ppm region) was reduced by the values corresponding to the CF$_2$ of HFP and of CTFE, that is to say two thirds of the CF$_3$ (HFP) integral and twice the CFCl (CTFE) integral. Half of the value remaining gave the relative content of VF$_2$. The corresponding molar proportions were then determined by dividing each relative content by the sum of the VF$_2$, HFP and CTFE relative contents and by multiplying by 100.

Measurement of the Melting Point (T$_m$)

The melting point (T$_m$) was determined by differential scanning calorimetry at the second pass, according to the ASTM 3418 standard, with a maximum heating temperature of 250° C. and a time to cool the apparatus from 250° C. to 20° C. of 10 minutes.

Measurement of the Conventional Crystallinity Index (CCI)

The conventional crystallinity index (CCI) was measurement by X-ray diffraction on a compression-moulded plaque 2 mm in thickness. This method was based on the measurement of the intensities of the diffuse background coming from the amorphous phase and the characteristic lines from the crystal habits of the polymer between d=8.838 Å and d=2.976 Å. The results were expressed in the form of a conventional crystallinity index which is the ratio of the sum of the areas of the crystalline peaks to the total area (the sum of the areas of the crystalline peaks+ diffuse band coming from the amorphous material). A non-zero conventional crystallinity index testifies that the polymer is semicrystalline.

Measurement of the Mean Diameter (D$_{50}$)

The mean diameter (D$_{50}$) was measured by the laser diffraction technique using a MALVERN 2600 c particle size analyzer. A low-power (2 mW) He—Ne laser beam was diffracted by the polymer particles suspended in a liquid (an aqueous alcoholic solution and wetting agent). The angle of diffraction depended on the size of these particles and a detector delivered an electronic signal proportional to the light energy measured. A computer calculated the volume distribution and the mean diameter of the particles.

Solubility in Acetone Test

An increasing amount of polymer was mixed at room temperature with 100 g of dry acetone with stirring. The stirring was provided by a magnetic stirrer. The addition of polymer was stopped when the magnetic stirrer could no longer rotate or when the presence of insoluble matter was detected visually: The maximum solubility is expressed as the number of grams of polymer dissolved in 100 g of dry acetone.

Intrinsic Viscosity

The intrinsic viscosity, expressed in l/g, of the polymer obtained was measured at 25° C. by comparing the flow time of a given volume of a 2 g/l polymer solution in dimethylformamide through a precalibrated capillary (Ostwald viscometer) with the flow time of dimethylformamide under the same conditions.

The intrinsic viscosity was calculated from the compared flow times by applying the formula:

$$[\eta]=(\eta_{rel}-1)+\gamma ln\eta_{rel}/c(\gamma+1)$$

in which $\eta_{rel}$ is the relative viscosity, equal to $t_c/t_{0c}$, $\gamma$ is a constant equal to 3, c is the concentration in g/l, $t_c$ is the corrected flow time of the solution and $t_{0c}$ is the corrected flow time of the solvent, these times being corrected by using the viscometer constant K (expressed in s$^2$) by means of the formulae:

$$t_c=t-(K/t) \text{ and } t_{0c}=t_0-(K/t).$$

Mechanical Properties in Tension

The mechanical properties in tension were evaluated at room temperature according to the ASTM D 638 standard. The tensile modulus, the elongation at break, the stress and elongation at yield, the length immediately after fracture, the length after 24 hours and the embrittlement temperature were measured.

EXAMPLE 1

Successively introduced into a 4-litre jacketed reactor fitted with a stirrer of the impeller type rotating at 880 revolutions/minute were a certain amount of demineralized water and a certain amount of an aqueous solution of the suspension agent, which was methylhydroxypropylcellulose. The amounts of demineralized water and suspension agent are given in Table I. Most of the oxygen present in the reactor was removed by pulling a vacuum of 40 mbar (at 14° C.) five times with, after the first four times, repressurization with 1 bar of nitrogen. A certain amount, specified in Table I, of a perester-type initiator (t-amyl perpivalate) was then introduced at the same time as a certain amount, specified in Table I, of diethyl carbonate. After waiting for 5 minutes, the reactor was charged, in the following order, with 35 g of chlorotrifluoroethylene, 174 g of hexafluoropropylene and 1184 g of vinylidene fluoride, i.e. 2.5 wt % of chlorotrifluoroethylene, 12.5 wt % of hexafluoropropylene and 85 wt % of vinylidene fluoride, respectively. The reactor was then gradually heated until a hold temperature of 55° C. was reached. This temperature was held for 5 hours. At the same time, the 120 bar polymerization pressure was maintained while injecting water at a later stage. At the end of polymerization, the aqueous suspension was degassed (by lowering the pressure to atmospheric pressure). The polymer was then collected by filtration and put back into suspension in clean water in a stirred tank. After a washing cycle, the polymer was oven-dried at 60° C. until constant weight. The total duration of the polymerization and the degree of conversion are given in Table I.

The MFI measured with a weight of 21.6 kg, the apparent density after tamping (ADAT), the content of the various comonomers, the melting point ($T_m$) and the conventional crystallinity index (CCI) measured on the polymer obtained are mentioned in Table II.

The maximum solubility in acetone was 22 g in 100 g of dry acetone.

The intrinsic viscosity of the polymer obtained was 0.215 l/g.

EXAMPLE 2

A certain amount of demineralized water and a certain amount of an aqueous solution of the suspension agent, namely methylhydroxypropylcellulose, were introduced in succession into the same reactor as in Example 1. The amounts of demineralized water and of suspension agent are given in Table I. Most of the oxygen present in the reactor was removed by pulling a vacuum of 40 mbar (at 14° C.) five times with, after the first four times, repressurization with 1 bar of nitrogen. A certain amount, given in Table I, of a perester-type initiator (t-amyl perpivalate) was then introduced at the same time as a certain amount, specified in Table I, of diethyl carbonate. After waiting for 5 minutes, the reactor was charged, in the following order, with 60 g of chlorotrifluoroethylene, 190 g of hexafluoropropylene and 720 g of vinylidene fluoride, i.e. 6.18 wt % of chlorotrifluoroethylene, 19.58 wt % of hexafluoropropylene and 74.22 wt % of vinylidene fluoride, respectively. The reactor was then gradually heated until a hold temperature of 55° C. was reached. This temperature was held for 4 hours 20 minutes. At the same time, the 120 bar polymerization pressure was maintained, while injecting 523 g of vinylidene fluoride at a later stage. At the end of polymerization, the aqueous suspension was degassed (by lowering the pressure to atmospheric pressure). The polymer was then collected by filtration and then put back into suspension in clean water in a stirred tank. After a washing cycle, the polymer was oven-dried at 60° C. until constant weight. The total duration of the polymerization and the degree of conversion are given in Table I.

The MFI measured with a weight of 21.6 kg, the apparent density after tamping (ADAT), the content of the various comonomers and the melting point ($T_m$) measured on the polymer obtained are mentioned in Table II.

EXAMPLE 3

This example was produced according to the same operating method as in Example 1. Table I gives the polymerization conditions.

Unlike the operating method of Example 1, the reactor was charged, in the following order, with 32 g of chlorotrifluoroethylene, 159 g of hexafluoropropylene and 1401 g of vinylidene fluoride, i.e. 2 wt % of chlorotrifluoroethylene, 10 wt % of hexafluoropropylene and 88 wt % of vinylidene fluoride respectively.

The MFI measured with a weight of 10 kg, the apparent density after tamping (ADAT), the content of the various comonomers, the melting point ($T_m$) and the conventional crystallinity index (CCI) measured on the polymer obtained are mentioned in Table II.

The maximum solubility in acetone was 24 g in 100 g of dry acetone.

The mechanical properties measured on the polymer obtained were the following: the tensile modulus, which was 840 MPa, the elongation at break, which was 460% and the stress at break, which was 48 MPa.

EXAMPLE 4

This example was produced according to the same operating method as in Example 1. Table I gives the polymerization conditions.

Unlike the operating method of Example 1, the reactor was charged, in the following order, with 79 g of chlorotrifluoroethylene, 550 g of hexafluoropropylene and 943 g of vinylidene fluoride, i.e. 5 wt % of chlorotrifluoroethylene, 35 wt % of hexafluoropropylene and 60 wt % of vinylidene fluoride respectively.

The MFI measured with a weight of 21.6 kg, the apparent density after tamping (ADAT), the content of the various comonomers, the melting point ($T_m$), and the conventional crystallinity index (CCI) measured on the polymer obtained are mentioned in Table II.

The maximum solubility in acetone was 30 g in 100 g of dry acetone.

EXAMPLE 5

This example was produced according to the same operating method as in Example 1. Table I gives the polymerization conditions.

Unlike the operating method of Example 1, the reactor was charged, in the following order, with 79 g of hexafluoropropylene, 393 g of chlorotrifluoroethylene and 1100 g of vinylidene fluoride, i.e. 25 wt % of chlorotrifluoroethylene, 5 wt % of hexafluoropropylene and 70 wt % of vinylidene fluoride respectively.

The MFI measured with a weight of 21.6 kg, the apparent density after tamping (ADAT), the content of the various comonomers, the melting point ($T_m$) and the conventional crystallinity index (CCI) measured on the polymer obtained are mentioned in Table II.

The maximum solubility in acetone was 23 g in 100 g of dry acetone.

EXAMPLE 6

This example was produced according to the same operating method as in Example 1. Table I gives the polymerization conditions.

Unlike the operating method of Example 1, the suspension agent was ethylhydroxy ethylcellulose and the reactor was charged, in the following order, with 33 g of chlorotrifluoroethylene, 153 g of hexafluoropropylene and 1206 g of vinylidene fluoride, i.e. 2.4 wt % of chlorotrifluoroethylene, 11 wt % of hexafluoropropylene and 86.6 wt % of vinylidene fluoride respectively.

The MFI measured with a weight of 10 kg, the content of the various comonomers, the melting point ($T_m$) and the conventional crystallinity index (CCI) measured on the polymer obtained are mentioned in Table II.

The solubility in acetone test, applied to the polymer obtained, showed that the solution obtained with 15 g of polymer in 100 g of dry acetone was clear after stirring for half an hour. The solution was also very stable, as demonstrated by the absence of gelling, even after 10 days. Nor was any gelling observed if the solution was exposed to a temperature of 4° C.

EXAMPLE 7

This example was produced according to the same operating method as in Example 1. Table I gives the polymerization conditions.

Unlike the operating method of Example 1, the reactor was charged, in the following order, with 64 g of hexafluoropropylene, 319 g of chlorotrifluoroethylene and 894 g of vinylidene fluoride, i.e. 25 wt % of chlorotrifluoroethylene, 5 wt % of hexafluoropropylene and 70 wt % of vinylidene fluoride respectively.

The MFI measured with a weight of 5 kg, the apparent density after tamping (ADAT), the content of the various comonomers, the melting point ($T_m$) and the mean diameter ($D_{50}$) measured on the polymer obtained are mentioned in Table II.

The mechanical properties measured on the polymer obtained were the following: the length at break, which was 147%, the stress at break, which was 3.6 MPa, the length at yield, which was 129%, the stress at yield, which was 3.7 MPa, the length immediately after break, which was 18 mm, the length after 24 hours, which was 15 mm, and the embrittlement temperature, which was less than −50° C.

EXAMPLE 8

This example was produced according to the same operating method as in Example 1. Table I gives the polymerization conditions.

Unlike the operating method of Example 1, the reactor was charged, in the following order, with 500 g of hexafluoropropylene, 2503 g of chlorotrifluoroethylene and 7004 g of vinylidene fluoride, i.e. 25 wt % of chlorotrifluoroethylene, 5 wt % of hexafluoropropylene and 70 wt % of vinylidene fluoride respectively.

The MFI measured with a weight of 5 kg, the content of the various comonomers, the melting point ($T_m$) and the mean diameter ($D_{50}$) measured on the polymer obtained are mentioned in Table II.

EXAMPLE 9 (COMPARATIVE EXAMPLE)

This example was produced according to the same operating method as in Example 1. Table I gives the polymerization conditions.

Unlike the operating method of Example 1, the reactor was charged, in the following order, with 478 g of chlorotrifluoroethylene, 955 g of hexafluoropropylene and 159 g of vinylidene fluoride, i.e. 30 wt % of chlorotrifluoroethylene, 60 wt % of hexafluoropropylene and 10 wt % of vinylidene fluoride respectively.

The terpolymer obtained did not have a melting peak and was considered to be amorphous. The content of the various comonomers measured on the terpolymer obtained is mentioned in Table II.

EXAMPLE 10 (COMPARATIVE EXAMPLE)

The solubility in acetone test applied to the vinylidene fluoride/chlorotrifluoroethylene copolymer SOLEF® 31008 containing 5.8 mol % of chlorotrifluoro-ethylene showed that the solution obtained with 15 g of polymer in 100 g of dry acetone gave a whitish coloration after stirring for half an hour.

EXAMPLE 11 (COMPARATIVE EXAMPLE)

The solubility in acetone test applied to the vinylidene fluoride/hexafluoropropylene copolymer SOLEF® 20810 containing 4 mol % of hexafluoropropylene showed that the solution obtained with 15 g of polymer in 100 g of dry acetone was still cloudy after stirring for half an hour. After one day, the solution had gelled.

TABLE I

| | Polymerization conditions | | | | | |
|---|---|---|---|---|---|---|
| Example No. | Demineralized water (g) | Suspension agent (g/100 g of monomer) | Initiator (g) | Diethyl carbonate (g) | Total duration (h, min) | Degree of conversion (%) |
| 1 | 1950 | 0.1 | 7.42 | 6.97 | 5 h | 86 |
| 2 | 2707 | 0.03 | 8.41 | 9.48 | 4 h 20 min | 65 |
| 3 | 1720 | 0.08 | 1.91 | 17.51 | 5 h 15 min | 87 |
| 4 | 1986 | 0.08 | 6.28 | 7.86 | 6 h 30 min | 62 |
| 5 | 1877 | 0.08 | 6.28 | 7.86 | 3 h 00 min | / |
| 6 | 2032 | 0.1 | 7.31 | 11.14 | 5 h 00 min | 84 |
| 7 | 2332 | 0.08 | 4.27 | 38.32 | 4 h 00 min | 83 |
| 8 | 18368 | 0.08 | 40 | 430.15 | 4 h 15 min | 90 |
| 9 (comparative) | 2608 | 0.05 | 4.24 | 11.14 | 7 h 00 min | 20 |

/: value not determined

TABLE II

| | Properties of the vinylidene fluoride polymers | | | | | | | |
|---|---|---|---|---|---|---|---|---|
| Example | MFI (weight, kg) | ADAT (g/cm³) | $VF_2$ content (mol %) | CTFE content (mol %) | HFP content (mol %) | $T_m$ (° C.) | ICC | $D_{50}$ (µm) |
| 1 | 2.26 (21.6) | 0.6 | 95 | 1.6 | 3.4 | 141.3 | 0.42 | / |
| 2 | 12.7 (21.6) | 0.44 | 93.1 | 3.3 | 3.6 | 137.4 | / | / |
| 3 | 0.6 (10) | 0.59 | 96.1 | 1.2 | 2.7 | 148.3 | / | / |
| 4 | 4.6 (21.6) | 0.23 | 86.6 | 4.4 | 9 | 92.4 | 0.2 | / |
| 5 | 0.27 (21.6) | / | 82.6 | 16 | 1.4 | 128.7 | 0.14 | / |
| 6 | 1.6 (10) | / | 95.8 | 1.3 | 2.9 | 147.3 | 0.44 | / |
| 7 | 1.8 (5) | 0.53 | 82 | 16.9 | 1.2 | 139.1 | / | / |
| 8 | 7 (5) | / | 81.9 | 16.8 | 1.3 | 139.9 | / | / |
| 9 (comparative) | / | / | 56.4 | 38.8 | 4.8 | / | / | / |

/: value not determined

What is claimed is:

1. A thermoplastic vinylidene fluoride/chlorotrifluoroethylene/hexafluoropropylene terpolymer comprising at least 70 mol % vinylidene fluoride and 1–10 mol % hexafluoropropylene.

2. The terpolymer according to claim 1, containing from 0.5 to 20 mol % chlorotrifluoroethylene.

3. The terpolymer according to claim 1, containing at least 80 mol % vinylidene fluoride.

4. The terpolymer according to claim 1, containing from 80 to 99 mol % vinylidene fluoride, from 0.5 to 19.5 mol % chlorotrifluoroethylene and from 1.2–9 mol % hexafluoropropylene.

5. The terpolymer according to claim 1, comprising 81–98 mol % vinylidene fluoride and 1–18 mol % chlorotrifluoroethylene.

6. The terpolymer according to claim 1, wherein the mean particle diameter is at least 10 μm.

7. The terpolymer according to claim 1, wherein the mean particle diameter is at most 350 μm.

8. The terpolymer according to claim 1, said terpolymer having a maximum solubility in acetone at room temperature of greater than or equal to 15 g of polymer dissolved in 100 g of dry acetone.

9. A surface covered with the terpolymer of claim 1.

10. A textile coated with the terpolymer of claim 1.

11. A membrane comprising the terpolymer of claim 1.

12. A flexible article comprising the terpolymer according to claim 1.

13. The terpolymer of claim 1, wherein the terpolymer is semicrystalline.

14. The terpolymer of claim 4, wherein the terpolymer is semicrystalline.

15. The terpolymer of claim 5, wherein the terpolymer is semicrystalline.

16. A process for manufacturing the terpolymer according to claim 1, wherein the vinylidene fluoride, chlorotrifluoroethylene and hexafluoropropylene are polymerized in aqueous suspension.

17. The process according to claim 16, wherein the polymerization takes place in the presence of at least one oil-soluble radical polymerization initiator and of at least one suspension agent.

18. The process according to claim 16, wherein all the chlorotrifluoroethylene, all the hexafluoropropylene and at least a part of the vinylidene fluoride are introduced at the start of the polymerization.

19. The process according to claim 16, wherein at the start of the polymerization, the monomers are introduced by beginning with that one whose amount to be added is the least and finishing with that one whose amount to be added is the most.

20. The process according to claim 16, wherein the polymerization is carried out in the presence of a chain regulator.

* * * * *